United States Patent
Ohsumi et al.

(10) Patent No.: US 9,911,964 B2
(45) Date of Patent: Mar. 6, 2018

(54) VEHICLE-MOUNTED ELECTRICAL EQUIPMENT AUXILIARY ELECTRICITY STORAGE DEVICE AND CAR EQUIPPED WITH ELECTRICAL EQUIPMENT AUXILIARY ELECTRICITY STORAGE DEVICE

(71) Applicant: SANYO Electric Co., Ltd., Osaka (JP)

(72) Inventors: Nobuyuki Ohsumi, Hyogo (JP); Yoshiaki Ueta, Shizuoka (JP); Toru Iwabuchi, Miyagi (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 203 days.

(21) Appl. No.: 14/888,706

(22) PCT Filed: Jun. 6, 2014

(86) PCT No.: PCT/JP2014/003034
§ 371 (c)(1),
(2) Date: Nov. 2, 2015

(87) PCT Pub. No.: WO2014/208020
PCT Pub. Date: Dec. 31, 2014

(65) Prior Publication Data
US 2016/0111702 A1     Apr. 21, 2016

(30) Foreign Application Priority Data
Jun. 28, 2013   (JP) .................................. 2013-135935

(51) Int. Cl.
*H01M 2/02*     (2006.01)
*H01M 2/06*     (2006.01)
(Continued)

(52) U.S. Cl.
CPC .......... *H01M 2/305* (2013.01); *B60L 11/1879* (2013.01); *H01M 2/06* (2013.01);
(Continued)

(58) Field of Classification Search
CPC ...... H01M 2/305; H01M 2/06; H01M 2/1083; H01M 2/1094; H01M 10/0445; B60L 11/1879
See application file for complete search history.

(56) References Cited

U.S. PATENT DOCUMENTS 6,472,098 B1 * 10/2002 Sawada ............... B60L 11/1809
429/100
2010/0170735 A1    7/2010 Nakamura et al.
(Continued)

FOREIGN PATENT DOCUMENTS

JP       62-135354 U    8/1987
JP       7-232565       9/1995
(Continued)

OTHER PUBLICATIONS

International Search Report of PCT application No. PCT/JP2014/003034 dated Sep. 2, 2014.

*Primary Examiner* — Jonathan G Jelsma
(74) *Attorney, Agent, or Firm* — Wenderoth, Lind & Ponack, L.L.P.

(57) ABSTRACT

An auxiliary power storage device for an electric device installed in a vehicle, is connectable to a battery for the electric device in parallel to supply power to a vehicle load installed in the vehicle, and the auxiliary power storage device comprises a power storage portion and a housing case storing the power storage portion, and further the hosing case comprises a hole portion fitted to a terminal portion of the power storage portion, a mountain-shaped projecting portion integrally formed on a wall surface standing from a peripheral portion of the hole portion for preventing a liquid
(Continued)

drop flowing down along the wall surface from intruding into the hole portion, and a projecting portion integrally formed along the peripheral portion of the hole portion for preventing a liquid drop from intruding into the hole portion from the peripheral portion of the hole portion.

9 Claims, 11 Drawing Sheets

(51) Int. Cl.
    *H01M 2/30*     (2006.01)
    *B60L 11/18*     (2006.01)
    *H01M 2/10*     (2006.01)
    *H01M 10/04*     (2006.01)

(52) U.S. Cl.
    CPC ....... *H01M 2/1083* (2013.01); *H01M 2/1094* (2013.01); *H01M 10/0445* (2013.01); *H01M 2220/20* (2013.01)

(56) References Cited

U.S. PATENT DOCUMENTS

| | | |
|---|---|---|
| 2011/0001352 A1 | 1/2011 | Tamura et al. |
| 2013/0224539 A1* | 8/2013 | Hayashi .............. H01M 2/1055 429/82 |
| 2014/0091767 A1 | 4/2014 | Tamura et al. |

FOREIGN PATENT DOCUMENTS

| | | |
|---|---|---|
| JP | 2008-074159 | 4/2008 |
| JP | 2011-015516 | 1/2011 |
| JP | 2012-221738 | 11/2012 |
| WO | 2012/133711 | 10/2012 |

\* cited by examiner

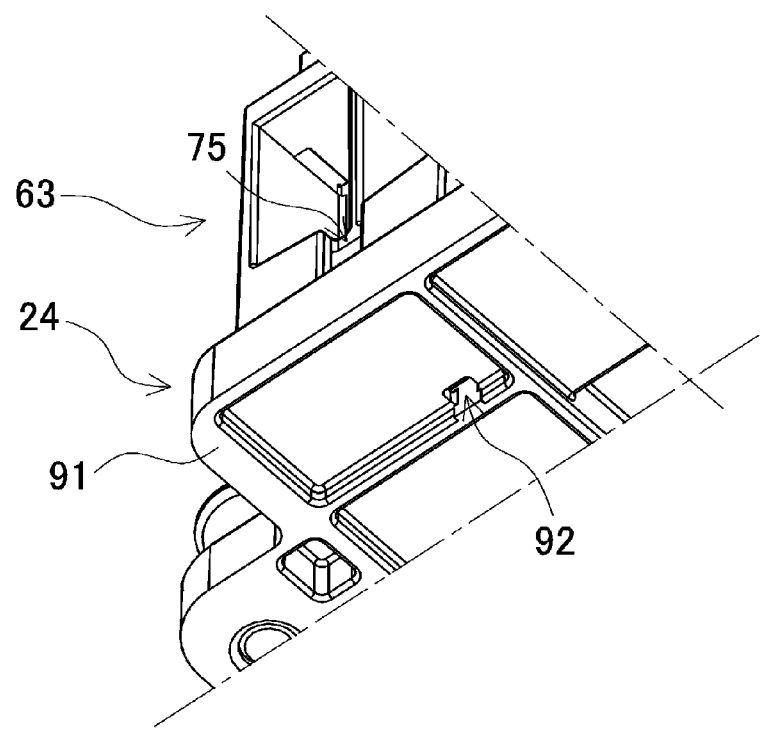
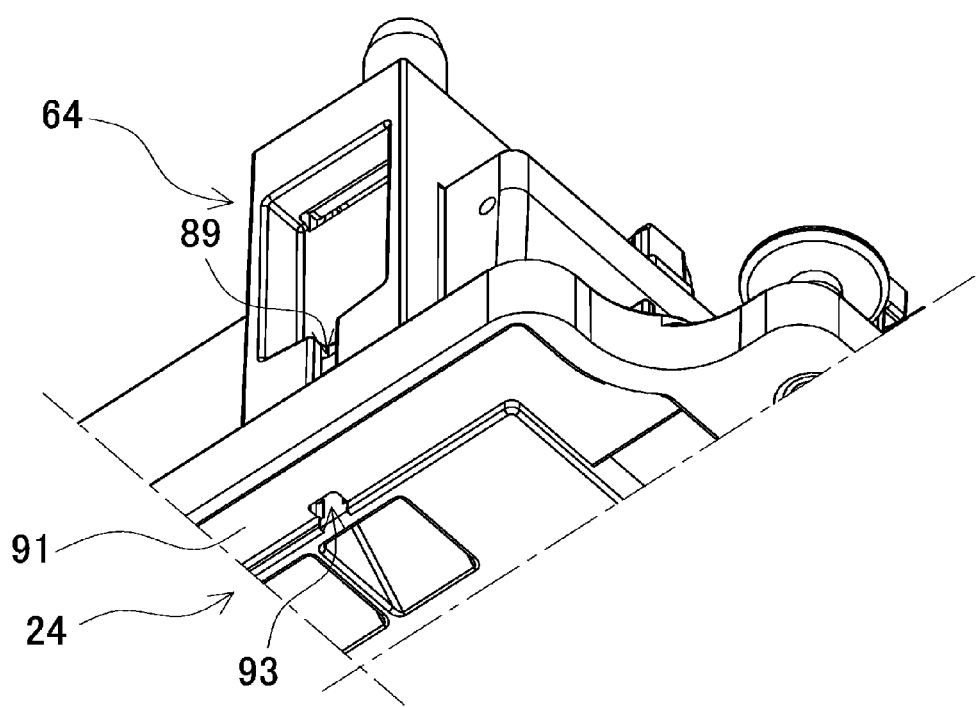

VEHICLE-MOUNTED ELECTRICAL EQUIPMENT AUXILIARY ELECTRICITY STORAGE DEVICE AND CAR EQUIPPED WITH ELECTRICAL EQUIPMENT AUXILIARY ELECTRICITY STORAGE DEVICE

CROSS-REFERENCE TO RELATED APPLICATIONS

This application is a U.S. national stage application of the PCT International Application No. PCT/JP2014/003034 filed on Jun. 6, 2014, which claims the benefit of foreign priority of Japanese patent application 2013-135935 filed on Jun. 28, 2013, the contents all of which are incorporated herein by reference.

TECHNICAL FIELD

The present invention relates to an auxiliary power storage device for an electric device installed in a vehicle, connectable in parallel to a battery for the electric device to supply power to a vehicle load installed in the vehicle, and a vehicle incorporating the auxiliary power storage device for an electric device.

BACKGROUND ART

A conventional vehicle incorporates a lead storage battery of which a rated voltage is 12V, as a battery for an electric device. Further, a large vehicle incorporates a battery of which a rated voltage is 24V. The battery of the large vehicle is formed by two of the lead storage batteries connected in series. The lead storage battery is charged by an alternator of the vehicle, and supplies power to vehicle load such as the electric device of the vehicle, a starter motor, or the like. Further, in order that the battery capacity (Ah) per volume or weight of the battery for the electric device is increased, the power source device for the vehicle connecting the auxiliary power storage device for the electric device, in which the lead storage battery and the nickel hydride battery or the lithium ion secondary battery are connected in parallel, has been developed (refer to patent literature 1).

In the power source device of patent literature 1, the lead storage battery electrically connected to an alternator and the auxiliary power storage device having the lithium ion secondary battery are connected in parallel. Additionally, in the power source device, since internal resistance or open circuit voltage of the lead storage battery or the lithium ion secondary battery is set so as to satisfy a predetermined condition, the lead storage battery and the lithium ion secondary battery are connected in parallel without through a DC/DC converter to reduce cost.

In the conventional power source having the auxiliary power storage device for the electric device configured of the lithium ion secondary battery which is connected in parallel with the lead storage battery, the lead storage battery is disposed at an engine room of the vehicle. The engine room easily receives the heat generated by the engine or other devices, or the heat from the outside air, and it is desirable that the auxiliary power storage device for the electric device is disposed at a place other than the engine room, being separated from the lead storage battery.

Then, the auxiliary power storage device for the electric device of the lithium ion secondary battery or the like is disposed, for example, on the floor under the seat in the cabin, utilizing a dead space (for example, refer to patent literature 2).

CITATION LIST

Patent Literature

Patent Literature 1: Japanese Laid-Open Patent Publication No. 2011-15516
Patent Literature 2: Japanese Laid-Open Patent Publication No. 2008-74159

SUMMARY OF THE INVENTION

In the structure where the auxiliary power storage device for the electric device is disposed on the floor under the seat in the cabin, the auxiliary power storage device for the electric device is rarely exposed to rainwater or the like, but, for example, it happens that liquid drop of juice or tea spilled by a passenger is scattered on the floor, and intrudes inside the auxiliary power storage device for the electric device. It also happens that water drop from an umbrella brought in the cabin flows down, and intrudes inside the auxiliary power storage device for the electric device. The battery is short-circuited when liquid intruding inside the auxiliary power storage device for the electric device comes into contact with output terminals or bus bars.

In order to solve such problems, it is considered that a housing case of the auxiliary power storage device for the electric device is made a perfect waterproof structure by using sealing material. However, in order to make it the perfect waterproof structure, waterproof packing is necessary, and then a manufacturing process is made complicated by increasing the number of parts. As a result, there is a problem that manufacturing cost is increased. Here, as the battery for the electric device has low voltage of 12V to 24V, it is not necessary that the housing case or the output terminal has the perfect waterproof structure.

The present disclosure is developed for the purpose of solving such problems. One non-limiting and explanatory embodiment provides an auxiliary power storage device for an electric device which effectively suppresses intrusion of liquid into a housing case thereof by a simple structure, and a vehicle having this.

In the present disclosure, an auxiliary power storage device for an electric device installed in a vehicle, connectable in parallel to a battery for the electric device in parallel to supply power to a vehicle load installed in the vehicle, comprises: a power storage portion having a terminal portion including an output terminal; and a housing case storing the power storage portion. Further the hosing case comprises: a hole portion fitted to the terminal portion of the power storage portion; a first guide portion provided on a wall surface standing from a peripheral portion of the hole portion for preventing a liquid drop flowing down along the wall surface from intruding into the hole portion; and a second guide portion provided at the peripheral portion of the hole portion for preventing a liquid drop from intruding into the hole portion from the peripheral portion of the hole portion. Accordingly, the first guide portion can effectively prevent the liquid drop flowing down along the wall surface from intruding into the hole portion, and further the second guide portion can effectively prevent the liquid drop from intruding into the hole portion from the peripheral portion of the hole portion.

Further, in the other present disclosure of the auxiliary power storage device for the electric device installed in the vehicle, the first guide portion is a projecting portion which is mountain-shaped and integrally formed with the wall surface. Accordingly, the liquid drop flowing down along the wall surface is prevented from dropping to the hole portion, and can be distributed to the peripheral portion of the hole portion, and then drops.

Further, in the other present disclosure of the auxiliary power storage device for the electric device installed in the vehicle, the second guide portion is a projecting portion which is integrally formed along the peripheral portion of the hole portion. Accordingly, the projecting portion as a wall can effectively prevent the liquid drop from intruding into the hole portion from the peripheral portion of the hole portion.

Further, in the other present disclosure of the auxiliary power storage device for the electric device installed in the vehicle, the second guide portion is a groove portion which is integrally formed along the peripheral portion of the hole portion. Accordingly, the liquid drop of the peripheral portion of the hole portion is collected into the groove portion, and the liquid drop can be effectively prevented from intruding into the hole portion from the peripheral portion of the hole portion.

Further, the other present disclosure of the auxiliary power storage device for the electric device installed in the vehicle, comprises a third guide portion provided under the hole portion for guiding a liquid drop intruded inside the power storage device from the hole portion to a discharging hole formed at a low portion of the housing case. Accordingly, the liquid drop intruding into the hole portion, is guided to the discharging hole by the third guide portion.

Further, in the other present disclosure of the auxiliary power storage device for the electric device installed in the vehicle, the third guide portion has a groove portion of downward inclination at the hole portion. Accordingly, the liquid drop intruding into the hole portion, is guided to the discharging hole along the groove portion.

Further, in the other present disclosure of the auxiliary power storage device for the electric device installed in the vehicle, an inflow side open portion of the discharge hole is not flush in itself. Accordingly, the liquid drop flowing into the discharge hole, is prevented from staying at the inflow (=entrance) of the discharge hole by the surface tension, and hardly being exhausted.

Further, in the other present disclosure of the auxiliary power storage device for the electric device installed in the vehicle, the housing case comprises an upper case and a lower case, and the upper case is connected to the lower case such that the upper case covers a periphery of the lower case. Accordingly, the housing case can be molded at low cost since the upper case and the lower case are separate. Then, the upper case and the lower case are easily positioned.

Further, in the other present disclosure of the auxiliary power storage device for the electric device installed in the vehicle, the power storage portion is a lithium ion secondary battery or a nickel hydride battery. Accordingly, compared with the lead storage battery, it is very effectively charged by regenerative power generated by the regenerative braking. Then, fuel efficiency of the vehicle can be remarkably improved.

Further, in the other present disclosure of the auxiliary power storage device for the electric device installed in the vehicle, a vehicle incorporating an auxiliary power storage device for an electric device installed in the vehicle, is connectable in parallel to a battery for the electric device to supply power to a vehicle bad installed in the vehicle, and the auxiliary power storage device comprises a power storage portion and a housing case storing the power storage portion, and further the hosing case comprising: a hob portion fitted to a terminal portion of the power storage portion; a first guide portion provided on a wall surface standing from a peripheral portion of the hole portion for preventing a liquid drop flowing down along the wall surface from intruding into the hole portion; a second guide portion provided at the peripheral portion of the hole portion for preventing a liquid drop from intruding into the hob portion from the peripheral portion of the hole portion. Accordingly, the vehicle incorporating the auxiliary power storage device for the electric device installed in the vehicle, can be provided.

BRIEF DESCRIPTION OF DRAWINGS

FIG. 11 is a perspective view showing a discharging hole formed in a lower case at the positive output terminal side.

FIG. 12 is a perspective view showing a discharging hole formed in the lower case at the negative output terminal side.

DESCRIPTION OF EMBODIMENTS

Hereinafter, the embodiment of the present invention will be described referring to drawings. However, the following embodiments illustrate an auxiliary power storage device for an electric device installed in a vehicle and a vehicle incorporating an auxiliary power storage device for an electric device which are aimed at embodying the technological concept of the present invention, and the present invention is not limited to the auxiliary power storage device for the electric device installed in the vehicle and the vehicle incorporating the auxiliary power storage device for the electric device described below. In particular, as long as specific descriptions are not provided, it is not intended that the claims be limited to sizes, materials, shapes, and relative arrangements of constitutional members described in the embodiments, which are mere descriptive examples. It is noted that the magnitude or positional relation of the members illustrated in each diagram is sometimes grandiloquently represented, in order to clarify the description. Furthermore, in the description below, identical names and reference numbers represent identical or homogeneous members, and detailed descriptions are appropriately omitted. Moreover, mode may be applied where each element constituting the present invention constitutes a plurality of elements with the use of the same member, thereby serving the plurality of elements with the use of one member, or, in contrast, mode may be realized where a function of the one member is shared by a plurality of members. Also, a portion of examples and the content described in the embodiments can be applied to other examples and another embodiment.

Figure 1:
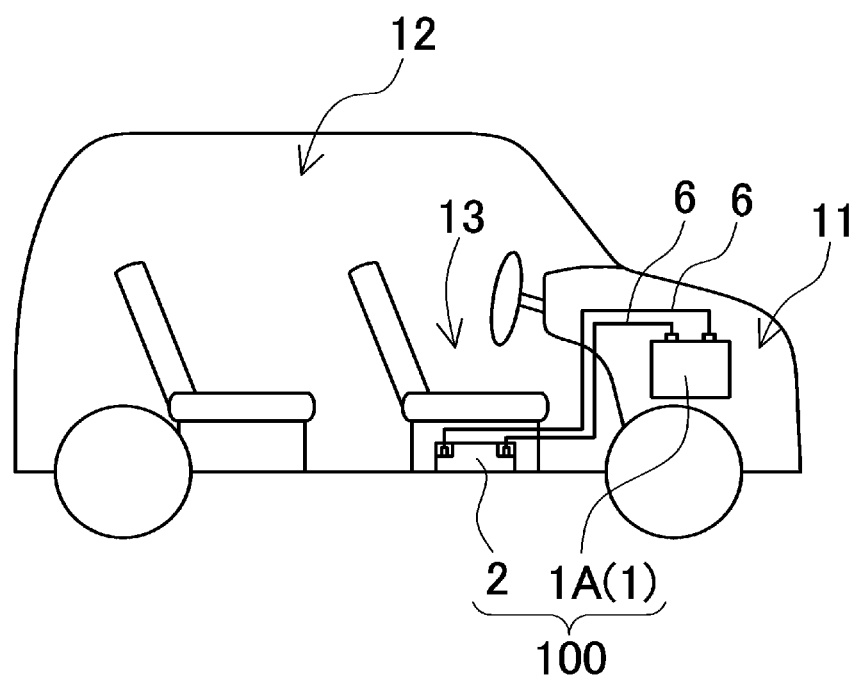
FIG. 1 is a schematic configuration diagram of a vehicle incorporating an auxiliary power storage device for an electric device relating to one embodiment of the present invention.
Figure 2:
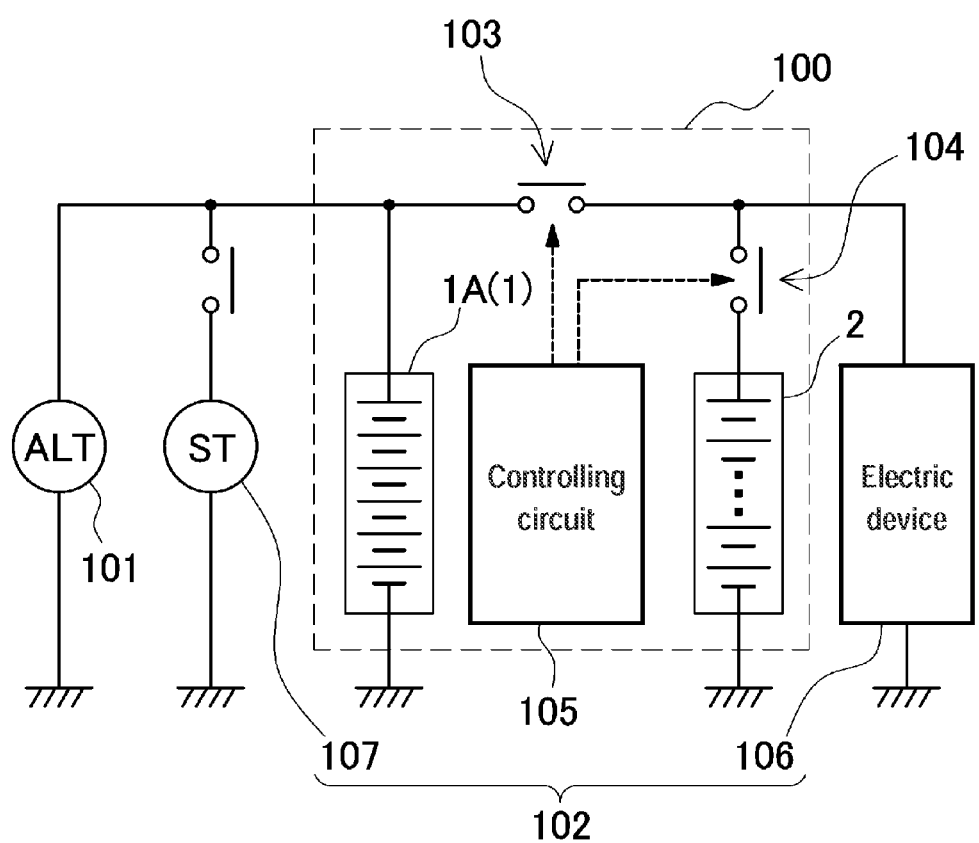
FIG. 2 is a block diagram of the vehicle incorporating the auxiliary power storage device for the electric device relating to one embodiment of the present invention.

The vehicle incorporating auxiliary power storage device 2 for the electric device which relates to an embodiment 1 of the present invention, is shown in FIG. 1 and FIG. 2. FIG. 1 shows a schematic configuration diagram of the vehicle incorporating the auxiliary power storage device 2 for the electric device, and FIG. 2 shows a block diagram of this vehicle. The vehicle shown in these figures incorporates auxiliary power storage device 2 connected in parallel to battery 1 for the electric device. The vehicle shown in the figures incorporates power source device 100 which supplies power to vehicle load 102, and this power source device 100 has battery 1 for the electric device and auxiliary power storage device 2 for the electric device. Auxiliary power storage device 2 is installed in the vehicle, and is connected in parallel to battery 1 to increase a battery capacity per volume or weight of power source device 100, or to improve fuel efficiency of the vehicle. In power source device 100, battery 1 or auxiliary power storage device 2 is charged by alternator 101 installed in the vehicle. Further, in power source device 100, battery 1 and auxiliary power storage device 2 discharge, and supply power to starter motor 107 installed in the vehicle and electric device 106 of vehicle load 10.

(Power Source Device 100)

Power source device 100 shown in FIG. 1 and FIG. 2 includes battery 1 for the electric device and auxiliary power storage device 2 connected in parallel to this battery 1. In power source device 100 shown in FIG. 2, battery 1 and auxiliary power storage device 2 are connected through first switch 103 in order to connect them in parallel. In power source device 100, in the ON state of first switch 103, battery 1 and auxiliary power storage device 2 are connected in parallel. While, in the OFF state of first switch 103, connecting state of battery 1 and auxiliary power storage device 2 is cut off. Further, in power source device 100, battery 1 and auxiliary power storage device 2 can be connected through a diode (not shown). Additionally, battery 1 and auxiliary power storage device 2 can be connected in parallel through a diode and a switch, which are connected in parallel each other. In the structure where battery 1 and auxiliary power storage device 2 are connected through a diode current in one direction is allowed, and current in opposite direction can be restricted.

Battery 1 and auxiliary power storage device 2 are disposed at predetermined location of the vehicle. In the vehicle shown in FIG. 1, battery 1 is disposed in engine room 11, and auxiliary power storage device 2 is disposed under seat 13 provided in cabin 12. The structure or location of battery 1 is not limited to this, and can be changed appropriately. Namely, battery 1 is not necessarily disposed in engine room 11, and battery 1 can be disposed at the other location, such as, cabin 12, or trunk room. As shown in FIG. 1, battery 1 and auxiliary power storage device 2 which are arranged away from each other, are connected by lead wire 6.

Auxiliary power storage device 2 is disposed under the assistant drivers seat or the driver's seat. Auxiliary power storage device 2 can be also disposed under the rear seat. In the vehicle having seats of plural rows in the rear like the station wagon or the one box car, auxiliary power storage device 2 can be disposed under the seats of the second row or the third row. However, in a case where auxiliary power storage device 2 is disposed at the rear portion away from engine room 11 in the vehicle, it is necessary that lead wire 6 connected to battery 1 is long. Therefore, preferably, auxiliary power storage device 2 is disposed under the seats of the front side in the vehicle.

(Battery 1 for the Electric Device)

Here, battery 1 for the electric device is lead storage battery 1A of which a rated voltage is 12V. The lead storage battery 1A is constructed of 6 cells connected in series. However, the present invention does not limit the rated voltage of lead storage battery 1A to 12V. It is possible that battery 1 having two pieces of lead storage batteries 1A connected in series has the rated voltage of 24V, and battery 1 having three pieces of lead storage batteries 1A connected in series has the rated voltage of 36V, and battery 1 having four pieces of lead storage batteries 1A connected in series has the rated voltage of 46V. The conventional electric device is designed so as to operate by the power source voltage of 12V, and then the vehicle incorporating battery 1 of 24V to 48V incorporates the electric device which operates by this voltage.

(Auxiliary Power Storage Device 2 for the Electric Device)

Figure 3:
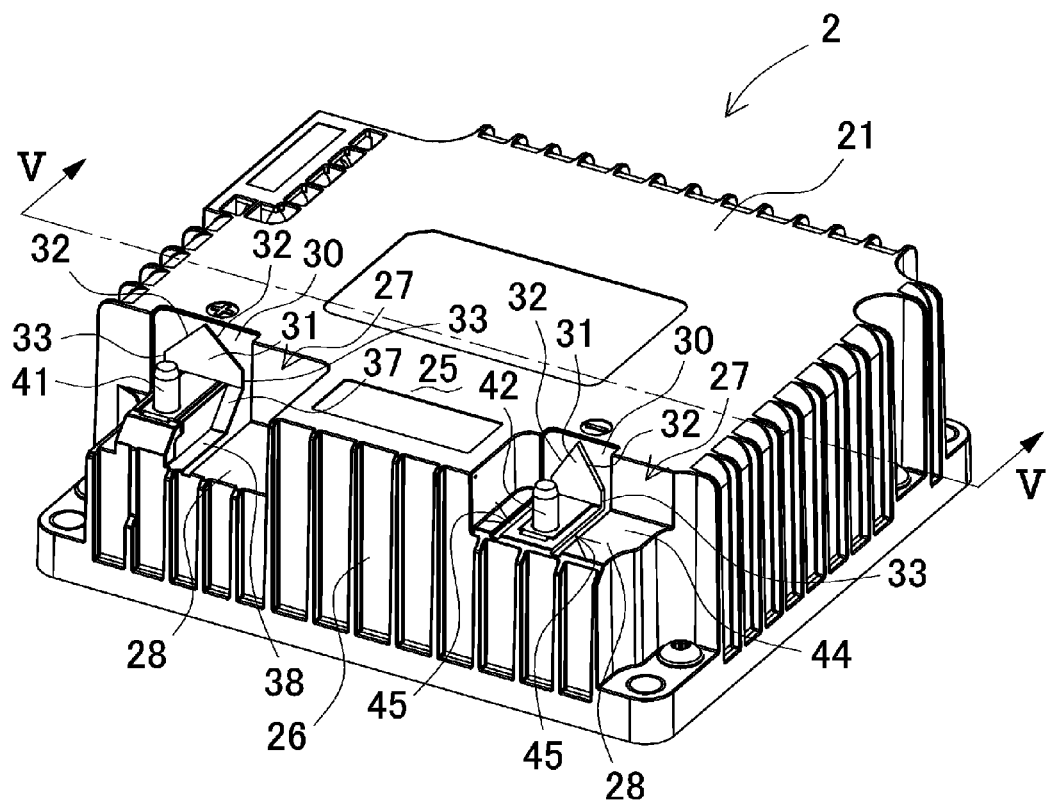
FIG. 3 is a perspective view of the auxiliary power storage device for the electric device.
Figure 4:
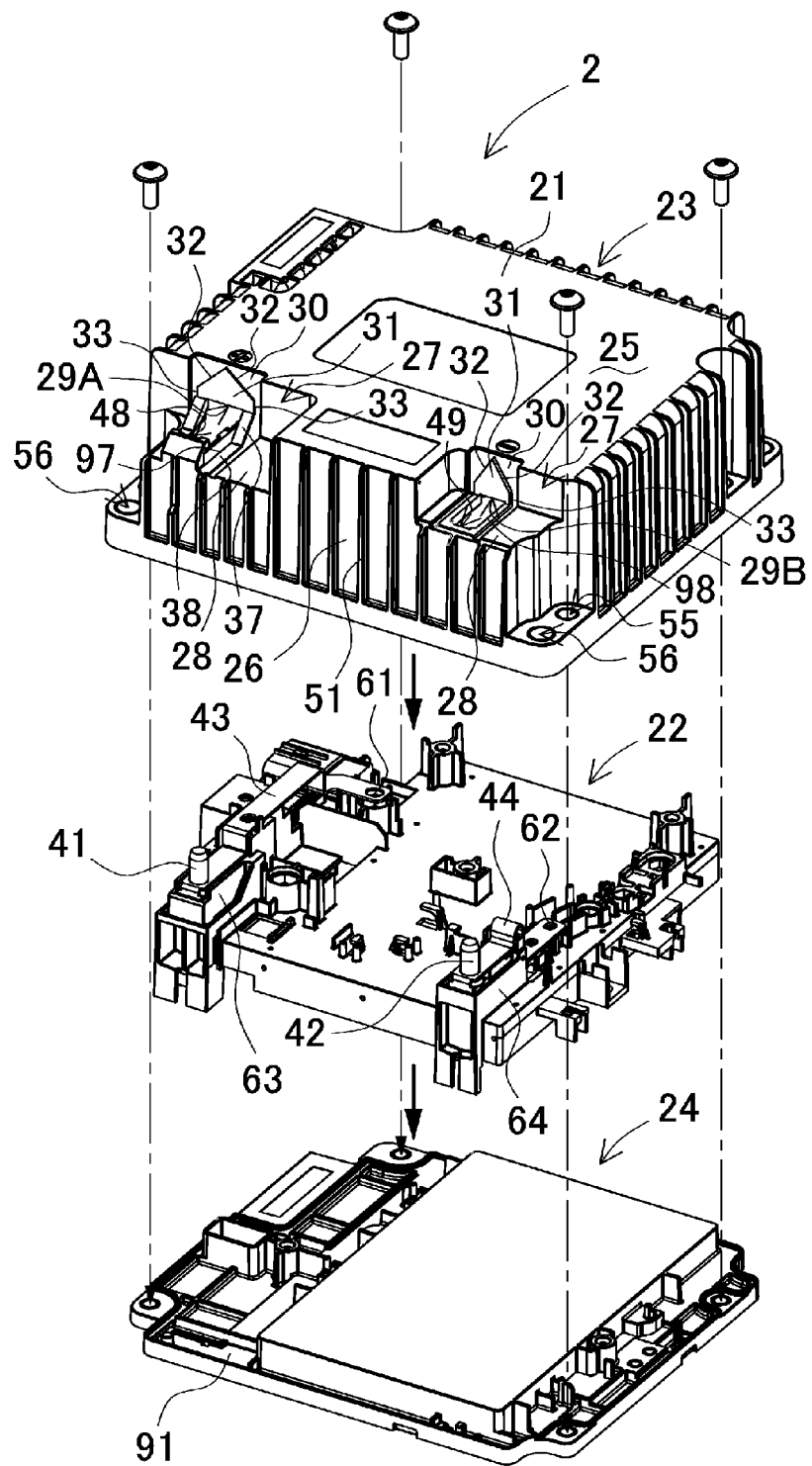
FIG. 4 is an exploded perspective view of the auxiliary power storage device for the electric device.
Figure 5:
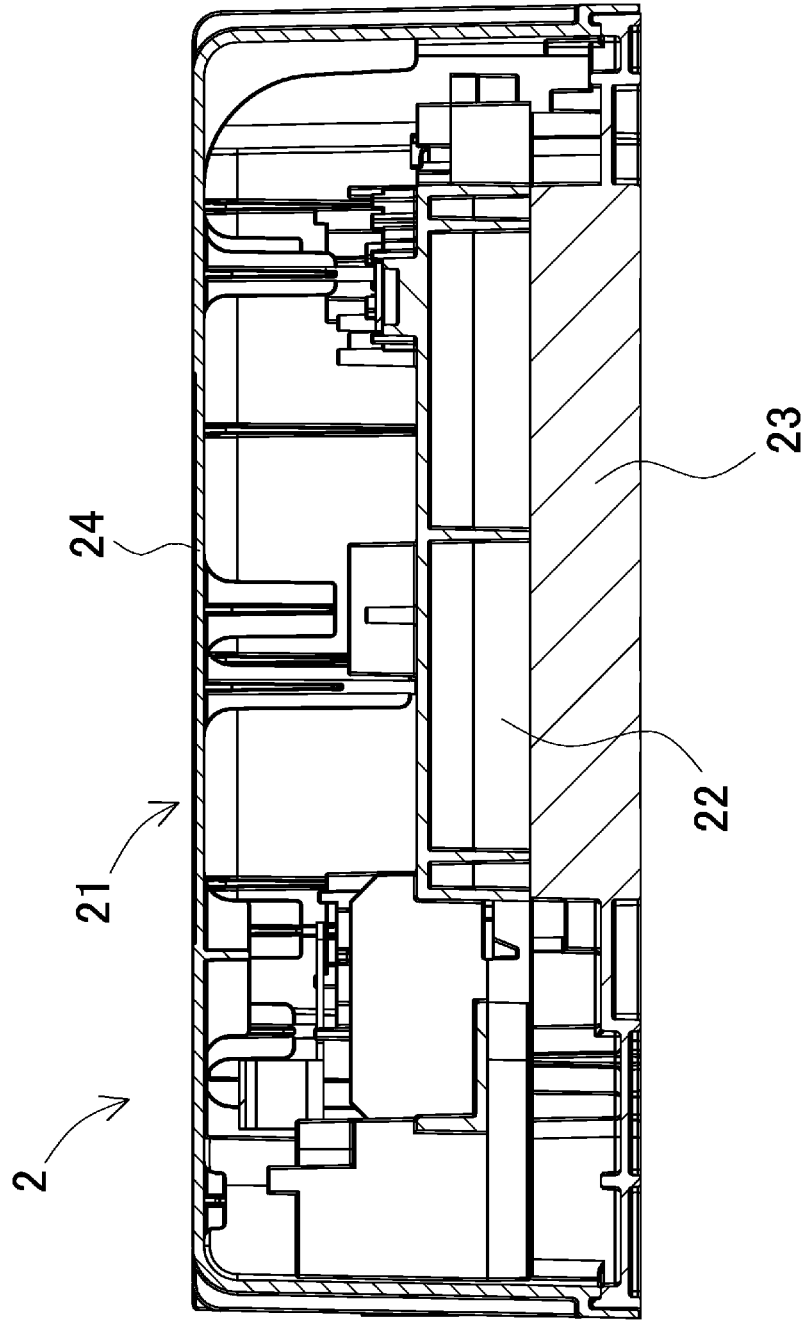
FIG. 5 is a longitudinal sectional view of the auxiliary power storage device for the electric device.
Figure 6:
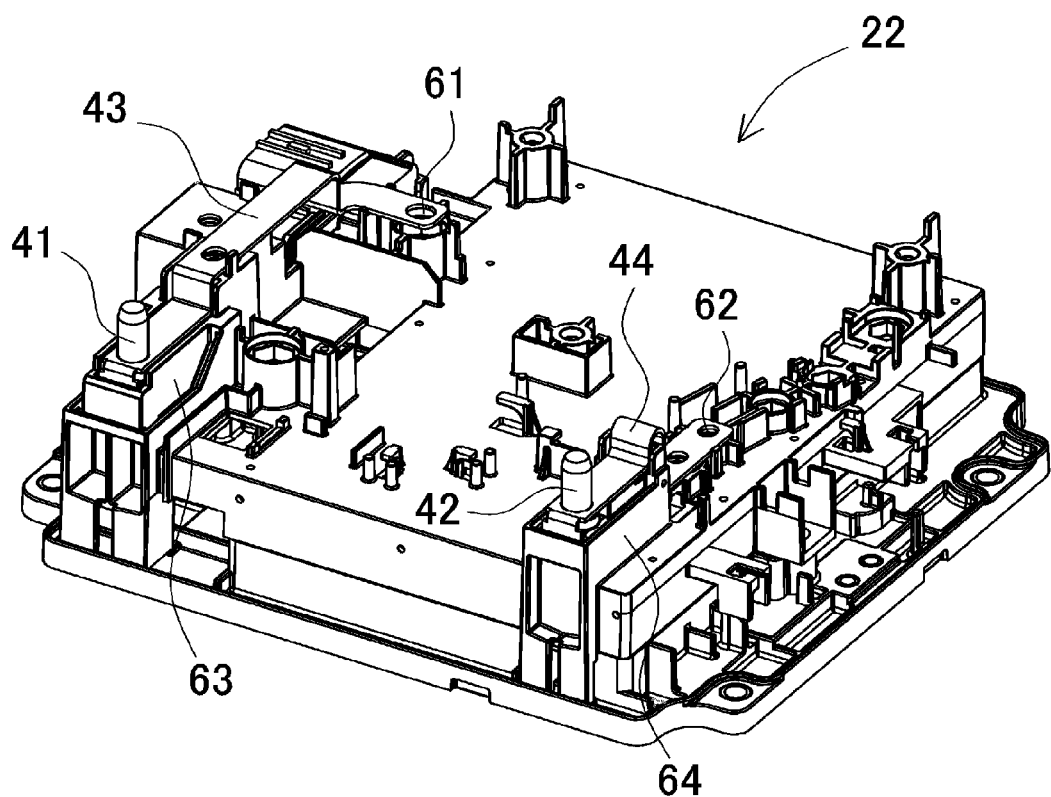
FIG. 6 is a perspective view of a state where an upper case of the auxiliary power storage device for the electric device is removed.
Figure 7:
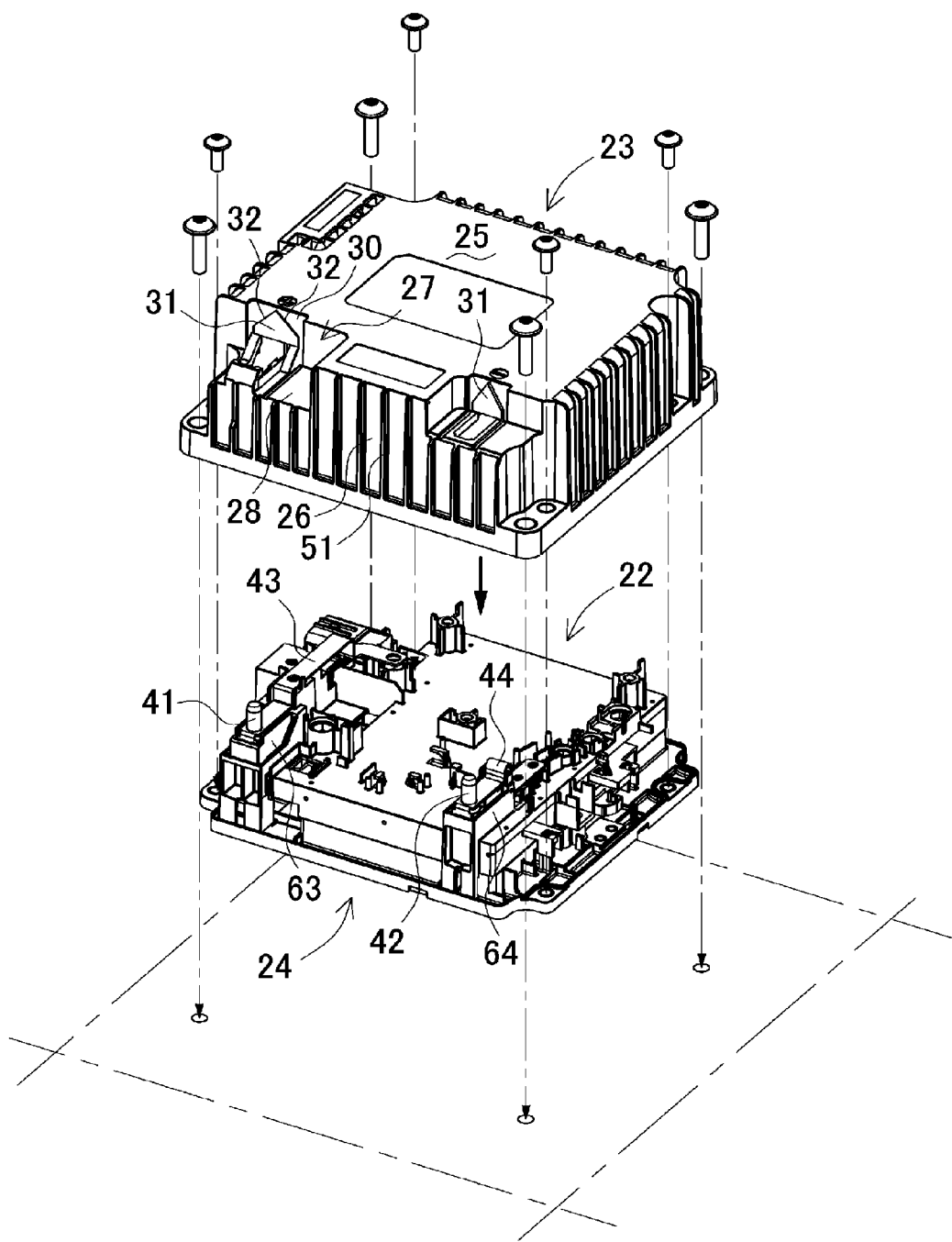
FIG. 7 is an exploded perspective view showing a way of disposing the auxiliary power storage device for the electric device.
Figure 8:
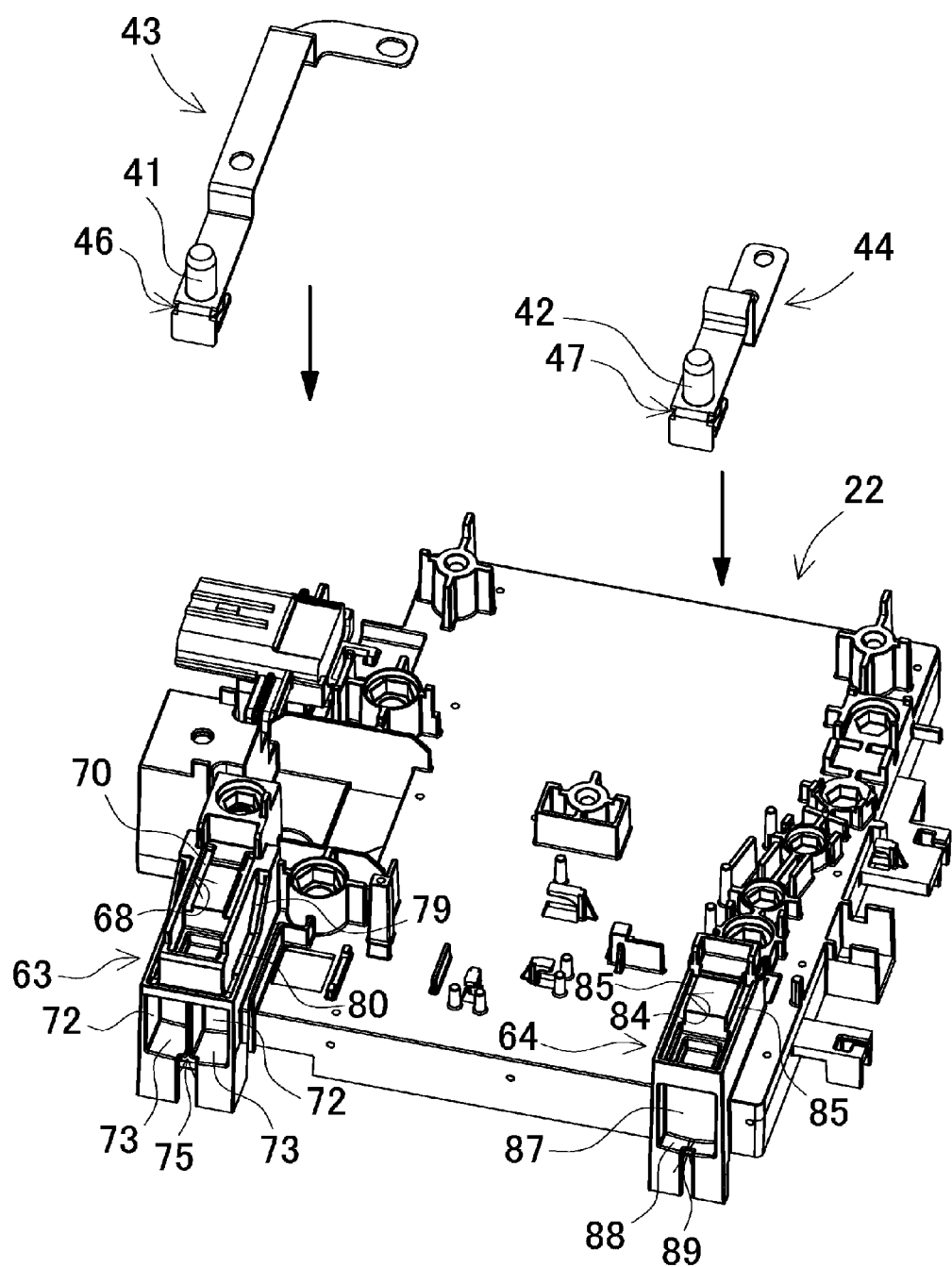
FIG. 8 is a perspective view of a state where output terminals and lead plates are removed from a power storage portion.
Figure 9:
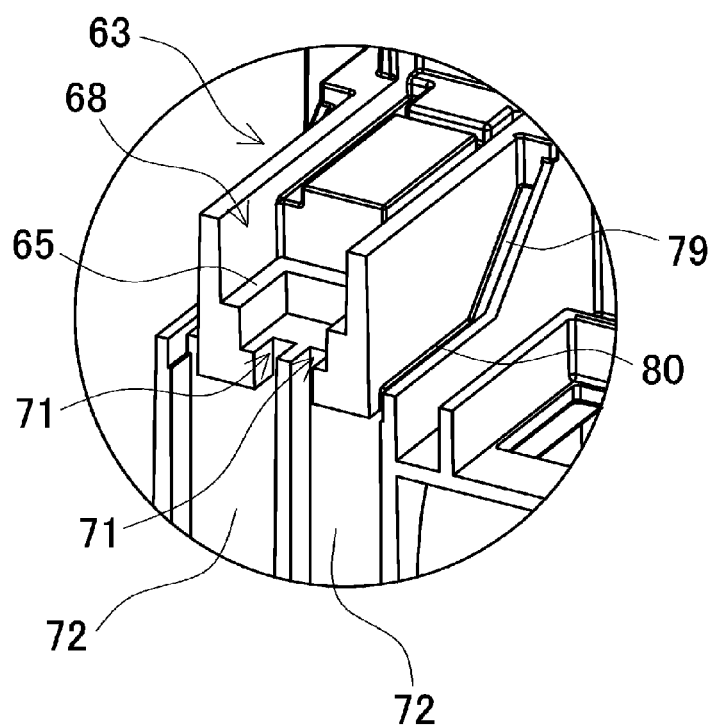
FIG. 9 is a sectional perspective view of a supporting portion of a positive output terminal side.
Figure 10:
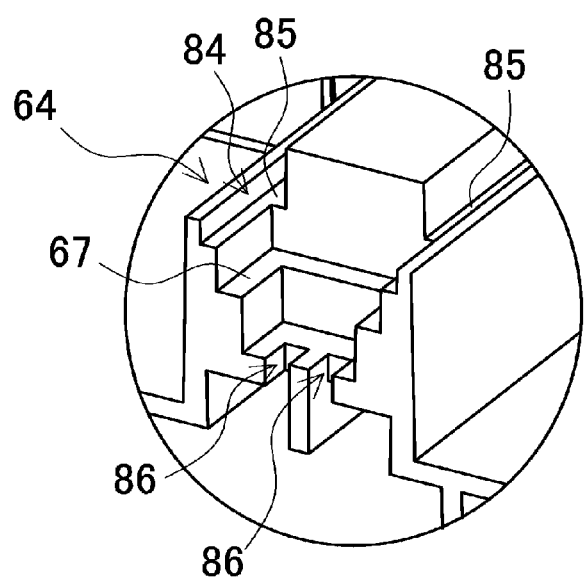
FIG. 10 is a sectional perspective view of a supporting portion of a negative output terminal side.

FIG. 3 is a perspective view of auxiliary power storage device 2, and FIG. 4 is an exploded perspective view of this auxiliary power storage device 2. FIG. 5 is a longitudinal sectional view along a line V-V of auxiliary power storage device 2 in FIG. 3, and FIG. 6 is a perspective view of a state where upper case 23 is removed. FIG. 7 is an exploded perspective view showing a way of disposing auxiliary power storage device 2. FIG. 8 is a perspective view of a state where positive and negative output terminals and lead plates are removed. FIG. 9 is a sectional perspective view of supporting portion 63 of positive output terminal 41 side. FIG. 10 is a sectional perspective view of supporting portion 64 of negative output terminal 42 side. As shown in FIG. 4, auxiliary power storage device 2 includes housing case 21 and power storage portion 22 stored in this housing case 21.

(Housing Case 21)

Housing case 21 is made of insulating material such as plastic, and is formed or molded. Housing case 21 includes upper case 23 and lower case 24. Upper case 23 is screwed to lower case 24 in a state where upper case 23 covers lower case 24 such that upper case 23 surrounds a periphery of lower case 24. Housing case 21 has a shape or a size so as to store power storage portion 22 inside at a predetermined location.

Housing case 21 has a non-waterproof structure. Here, the non-waterproof structure means that the structure is not the perfect waterproof structure which can perfectly prevent intrusion of water from outside. Accordingly, housing case 21 of the non-waterproof structure widely means the structure where water does not easily intrude inside from outside in a state of normal usage, such as, the structure where an opening portion of a box-shaped case is closed by a lid portion. Such a non-waterproof structure of housing case 21 has a feature to manufacture at low cost with the structure simplified and to easily maintain.

(Upper Case 23)

Upper case 23 has a cap-like shape in which the bottom portion of an approximately rectangular parallelepiped is opened. Step portions 27 are provided with a predetermined interval at two corners which links upper surface 25 of upper case 23 and peripheral wall 26. Step surfaces 28 as the bottom portions of step portions 27 are gently inclined downward toward outside. Hole portions 29A, 29B are respectively formed at step surfaces 28, and positive output terminal 41 of power storage portion 22 projects from hole portion 29A, and negative output terminal 42 projects from hole portion 29B. Wall surfaces 30 standing toward the upper surface from peripheral portions of hole portions 29A, 29B are formed, and mountain-shaped projecting portions 31 are formed on wall surfaces 30. Mountain-shaped projecting portion 31 is a first guide portion. Inclined surfaces 32 making the mountain-shape of projecting portion 31 are formed in left-right symmetry with respect to positive or negative output terminal 41, 42. The low end of inclined surface 32 connects to side surface 33 extending vertically.

At both side portions of hole portion 29A from which positive output terminal 41 projects, inclined surface 37 which is inclined downward from the low end of projecting portion 31 formed on wall surface 30, and linking surface 38 which links with the low end of inclined surface 37, are formed. Inclined surface 37 and linking surface 38 are the second guide portion, Inclined surface 37 and linking surface 38 are formed in the projecting shape. Then, the low ends of both side surfaces 33 of projecting portion 31 formed on wall surface 30 linearly link with the outer side surfaces of inclined surface 37 and linking surface 38.

At the peripheral portion of hole portion 29B from which negative output terminal 42 projects, groove portions 45 along the longitudinal direction of lead plate 44 are integrally formed, Groove portion 45 is the second guide portion. Groove portion 45 linearly links with the low end of side surface 33 of projecting portion 31, and is formed toward outside.

Here, at the outer edge in each of hole portions 29A, 28B in upper case 23, engaging portions 48, 49 respectively engaged with throat portions 46, 47 of lead plate 43, 44 are formed. At peripheral wall 26 of upper case 23, fins 51 for radiating heat generated in power storage portion 22 to the outside are provided. At the low end corners of upper case 23, hole portions 55 for screwing upper case 23 to lower case 24 are formed, and hole portions 56 for screwing upper case 23 to the floor or the like under seat 13 in cabin 12 are formed.

(Power Storage Portion 22)

Power storage portion 22 has positive and negative connecting terminals 61, 62 at the upper surface side. Positive and negative connecting terminals 61, 62 are respectively connected to the one ends of lead plates 43, 44, and output terminals 41, 42 are respectively engaged to the other ends of lead plates 43, 44. At the upper surface of power storage portion 22, supporting portions 63, 64 which support output terminal 41, 42 engaged to lead plates 43, 44 are provided. Supporting portions 63, 64 are formed in projecting shapes at the upper surface of power storage portion 22. Output terminals 41, 42 engaged to lead plate 43, 44 are fit into opening portions 68, 84 formed at the upper surface of supporting portions 63, 64, with lead plate 43, 44. Here, the lower portions of output terminals 41, 42 contact step portions 65, 67.

In supporting portion 63 of positive output terminal 41 side, output terminal 41 is fit into opening portion 68 with lead plate 43. At the lower inner side of opening portion 68, groove portion 70 with a U-shaped cross-section is formed along each of both side surfaces of lead plate 43. Groove portions 70 are gently inclined downward toward the outside of power storage portion 22. Hole portions 71 are formed under the low end of groove portion 70. Spaces 72 are formed under hole portions 71 with rib provided at the center. Hole portion 75 is formed at the bottom surfaces 73 of spaces 72.

At the outside of opening portion 68 in supporting portion 63, inclined groove 79 with a U-shaped cross-section is formed and inclined downward toward the outside along each of both side surfaces of lead plate 43. Further, linking groove 80 with a U-shaped cross-section is formed toward the outside and linked to the low end of inclined groove 79. The low end of linking groove 80 is connected to space 72. In the positive output terminal side, groove portion 70, inclined groove 79, and linking groove 80 configure the third guide portion.

In supporting portion 63 of negative output terminal 42 side, lead plate 44 engaged to output terminal 42 projects upward, and lead plate 44 in this state is fit to hole portion 293 of upper case 23. At the lower inner side of opening portion 84, groove portion 85 with a U-shaped cross-section is formed along each of both side surfaces of lead plate 44. Groove portions 85 are gently inclined downward toward the outside of power storage portion 22. Hole portions 86 are formed under the low end of groove portion 86. Space 87 is formed under hole portions 86. Hole portion 89 is formed at the bottom surfaces 88 of space 87. In negative output terminal 42 side, groove portion 85 configures the third guide portion.

(Lower Case)

Figure 13:
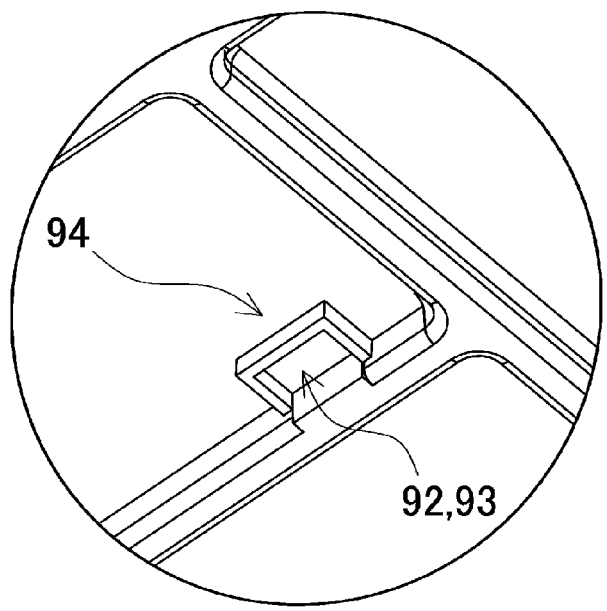
FIG. 13 is a perspective view of an entrance side of the discharging hole.

FIG. 11 shows discharging hole 92 formed in lower case 24 at positive output terminal 41 side. FIG. 12 shows discharging hole 93 formed in lower case 24 at negative output terminal 42 side. FIG. 13 shows entrance sides of discharging holes 92, 93. Lower case 24 is formed in a nearly quadrilateral plate-like shape. At bottom wall 91 of lower case 24, discharge holes 92, 93 are formed respectively under hole portion 75 of positive output terminal 41 side, and hole portion 89 of negative output terminal 42, which are formed in power storage portion 22. Opening portions of discharge holes 92, 93 are formed in a quadrilateral shape. In the opening portions at the entrance sides of discharge holes 92, 93 disposed at the upper surface of bottom wall 91, projecting portions 94 with U-shaped cross-sections at three sides in each of the opening portions are formed. Here, at four corners of lower case 24, screw holes for screwing upper case 23 and lower case 24 each other are provided.

When liquid drop which drops on upper surface 25 of upper case 23 flows down along wall surface 30, the liquid drop flows along inclined surfaces 32 of the mountain-shape at projecting portions 31 formed on wall surface 30, and is distributed to the left or right with respect to each of positive and negative output terminals 41, 42. The liquid drop distributed to the left or right of projecting portion 31, flows down along both side surfaces 33 of projecting portion 31.

In positive output terminal 41 side, the liquid drop which flows down along both side surfaces 33 of projecting portion 31, flows down along the outer side surfaces of inclined surface 37 formed on step surface 28 and linking surface 38 linking with the low end of inclined surface 37. Both side surfaces 33 of projecting portion 31, and the outer side surfaces of inclined surface 37 and linking surface 38 are linearly connected each other, and the liquid drop smoothly flows down along inclined surfaces 32 of the mountain-shape at projecting portions 31 formed on wall surface 30, and both side surfaces 33, further along the outer side surfaces formed on step surface 28 of inclined surface 37 and linking surface 38.

In negative output terminal 42 side, the liquid drop which flows down along both side surfaces 33 of projecting portion 31, flows into groove portions 45 formed at step surface 28. Both side surface 33 of projecting portion 31 and groove portion 45 are linearly connected each other, and the liquid drop smoothly flows down along inclined surfaces 32 of the mountain-shape at projecting portions 31 formed on wall surface 30, and both side surfaces 33, further along groove portions 45 formed at step surface 33.

Thus, the liquid drop flows along the upper surface of upper case 23, and flows down to positive and negative output terminals 41, 42 side, but it can be effectively suppressed that the liquid drop intrudes into the inside of auxiliary power storage device 2 through hole portions 29A, 29B into which positive and negative output terminals 41, 42 are fit.

In a case where the liquid drop is directly spilled to hole portion 29A into which positive output terminal 41 is fit, it happens that the liquid drop intrudes into the inside of housing case 21 through spaces between opening side edge surfaces 97 of inclined surfaces 37 or linking surfaces 38 and the side surface of supporting portion 63 in power storage portion 22. Alternatively, it happens that the liquid drop intrudes through a space between supporting portion 63 and lead plate 43 fit into supporting portion 63. The liquid drop intruding into the spaces between edge surfaces 97 of inclined surfaces 37 and the side surface of supporting portion 63, flows down along the side surface of supporting portion 63 of power storage portion 22, and flows into inclined grooves 79. Additionally, the liquid drop intruding through edge surfaces 97 of linking surfaces 38, flows down along the side surface of supporting portion 63 in power storage portion 22, and flows into linking grooves 80 connected and linking to inclined grooves 79.

The liquid drop flowing into inclined groove 79 or linking groove 80, drops to space 72. The liquid drop dropping to space 72, flows into hole portion 75, and drops to bottom wall 91 of lower case 24. The liquid drop dropping to bottom wall 91 of lower case 24, flows into discharge hole 92 formed at bottom wall 91, and is exhausted outside auxiliary power storage device 2.

The liquid drop intruding through the space between supporting portion 63 and lead plate 43 fit into supporting portion 63, flows into groove portion 70 formed along each of both side surfaces of lead plate 43. The liquid drop flowing into groove portion 70 drops to spaces 72 through hole portions 71. The liquid drop dropping to space 72, flows into hole portion 75, and drops to bottom wall 91 of lower case 24, and flows into discharge hole 92 formed at bottom wall 91, and is exhausted outside auxiliary power storage device 2.

In a case where the liquid drop is directly spilled or drops to hole portion 29B into which negative output terminal 42 is fit, it happens that the liquid drop intrudes through a space between opening side edge surfaces 98 of hole portion 29B and lead plate 44 fit into supporting portion 63. The liquid drop intruding into the space between opening side edge surfaces 98 of hole portion 29B and lead plate 44, flows into groove portions 85 formed at the lower inner sides of opening portion 84 in the supporting portion. The liquid drop flowing into groove portion 85, flows into hole portions 86, and then drops to space 87. The liquid drop dropping to space 87, flows into hole portion 89, and drops to bottom wall 91 of lower case 24. The liquid drop dropping to bottom wall 91 of lower case 24, flows into discharge hole 93 formed at bottom wall 91, and is exhausted outside auxiliary power storage device 2.

Figure 14:
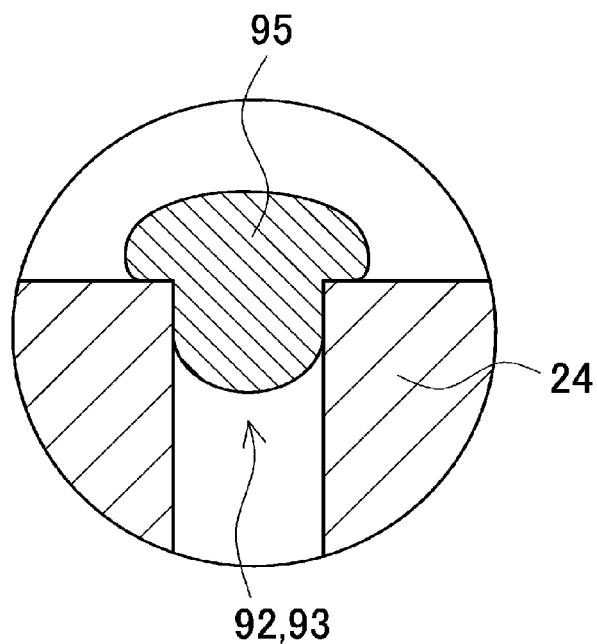
FIG. 14 is a schematic diagram of a state where a liquid drop enters the discharging hole.

FIG. 14 shows a state where the liquid drop enters discharging hole 92, 93. The opening portion of discharging hole 92, 93 is in a rectangular shape. In the opening portion of the upper surface side of bottom wall 91 at the inflow side of discharge hole 92, 93, the three sides in the four sides of the opening portion are surrounded by U-shaped projecting portion 94. Thus, since the inflow (=entrance) side of discharge hole 92, 93 is not flush in itself, it prevents the flow of the liquid drop from staying at the inflow (=entrance) side of discharge hole 92, 93.

In the present embodiment, as the first guide portion, projecting portions 31 having the mountain-shape are formed on wall surface 30. The liquid drop which drops on upper surface 25 of upper case 23, flows along inclined surfaces 32 of the mountain-shape at projecting portions 31, and is distributed to the left or right with respect to each of positive and negative output terminals 41, 42. However, it is not limited to this, for example, by grooves formed at wall surface 30, the liquid drop which drops on upper surface 21 of upper case 23 may be distributed to the left or right with respect to each of positive and negative output terminals 41, 42.

Thus, housing case 21 of auxiliary power storage device 2 is not made a perfect waterproof structure by using sealing material of waterproof packing or the like, and this simple structure effectively suppresses intrusion of liquid into housing case 21 of auxiliary power storage device 2. Thus, the number of parts is decreased and then the manufacturing process can be simplified. Further, when the liquid drop intrudes into is housing case 21 of auxiliary power storage device 2, the liquid drop can be exhausted or discharged easily.

As shown in FIG. 2, power source device 100 installed in the vehicle as mentioned above, is connected to alternator 101 installed in the vehicle or vehicle load 102, and is charged or discharged. Power source device 100 is connected in the middle between auxiliary power storage device 2 for the electric device and battery 1 for the electric device, and includes first switch 103 which connects auxiliary power storage device 2 to battery 1 in parallel; and includes second switch 104 which is connected at the output side of auxiliary power storage device 2 to prevent over-charge or over-discharge of auxiliary power storage device 2. Controlling circuit 105 controls connecting states of first switch 103 and second switch 104. A relay or a semiconductor switching element is used for first switch 103 or second switch 104. A transistor, a FET, an IGBT, or the like can be used as the semiconductor switching element. The first switch 103 can be disposed at engine room 11 or cabin 12. Second switch 104 is disposed in housing case 21 of auxiliary power storage device 2, and is connected between output terminal 41, 42 and the assembled battery.

Power source device 100 shown in the circuit diagram of FIG. 2, is charged by alternator 101 of the vehicle side. Alternator 101 of the vehicle side controls the output voltage in a charging state of power source device 100 such that the charging voltage does not exceed the maximum voltage (for example, 14V to 15V) to prevent over-charge of power source device 100. Controlling circuit 105 detects the remaining capacity of auxiliary power storage device 2. In a charging state where the remaining capacity of auxiliary power storage device 2 exceeds the maximum remaining capacity, controlling circuit 105 turns off second switch 104 to prevent over-charge of auxiliary power storage device 2 for protecting auxiliary power storage device 2.

Further, power source device 100 of the figures is discharged to supply power to electric device 106 or starter motor 107. In the vehicle side, alternator 101 is controlled to charge power source device 100 such that the voltage of power source device 100 is not decreased equal to or less than the optimum voltage. In a state where power source device 100 is discharged, controlling circuit 105 detects the remaining capacity of auxiliary power storage device 2. In a discharging state where the remaining capacity becomes equal to or less than the minimum remaining capacity, controlling circuit 105 turns off second switch 104 to prevent over-discharge of auxiliary power storage device 2.

INDUSTRIAL APPLICABILITY

The power source device for the vehicle and the vehicle incorporating it relating to the present invention, can be suitably used as the battery or auxiliary battery for the electric device in the vehicle. Especially, when the vehicle has the idling (=idle) stop function in which the lead storage battery is charged by the regenerative braking, load of the lead storage battery can be decreased.

The invention claimed is:

1. An auxiliary power storage device for an electric device installed in a vehicle, connectable in parallel to a battery for the electric device to supply power to a vehicle load installed in the vehicle, the auxiliary power storage device comprising:
a power storage portion having a terminal portion including an output terminal; and
a housing case storing the power storage portion,
wherein the housing case comprises:
a hole portion fitted to the terminal portion of the power storage portion;
a first guide portion provided on a wall surface standing from a peripheral portion of the hole portion for preventing a liquid drop flowing down along the wall surface from intruding into the hole portion, the first guide portion including a projection portion that is triangle shaped and integrally formed with the wall surface; and
a second guide portion provided at the peripheral portion of the hole portion for preventing a liquid drop from intruding into the hole portion from the peripheral portion of the hole portion, the second guide portion including an inclined surface, which is inclined downward from a low end of the projecting portion, and a linking surface, which links with a low end of the inclined surface, the linking surface disposed below the terminal portion of the power storage portion.

2. The auxiliary power storage device for the electric device installed in the vehicle according to claim 1, wherein the second guide portion is a projecting portion which is integrally formed along the peripheral portion of the hole portion.

3. The auxiliary power storage device for the electric device installed in the vehicle according to claim 1, wherein the power storage portion has another terminal portion including another output terminal, and the housing case further comprises:
another hole portion fitted to the other terminal portion of the power storage portion;
a third guide portion provided on a wall surface standing from a peripheral portion of the other hole portion for preventing a liquid drop flowing down along the wall surface from intruding into the other hole portion; and
a fourth guide portion including a groove portion which is integrally formed along the peripheral portion of the other hole portion.

4. The auxiliary power storage device for the electric device installed in the vehicle according to claim 1, further comprising
a third guide portion provided under the hole portion for guiding a liquid drop intruded inside the power storage device from the hole portion to a discharging hole formed at a low portion of the housing case.

5. The auxiliary power storage device for the electric device installed in the vehicle according to claim 4, wherein the third guide portion has a groove portion of downward inclination at the hole portion.

6. The auxiliary power storage device for the electric device installed in the vehicle according to claim 4, wherein an inflow side open portion of the discharging hole is not flush in itself.

7. The auxiliary power storage device for the electric device installed in the vehicle according to claim 1, wherein the housing case further comprises an upper case and a lower case, and the upper case is connected to the lower case such that the upper case covers a periphery of the lower case.

8. The auxiliary power storage device for the electric device installed in the vehicle according to claim 1, wherein the power storage portion is a lithium ion secondary battery or a nickel hydride battery.

9. A vehicle incorporating an auxiliary power storage device for an electric device installed in the vehicle, connectable in parallel to a battery for the electric device to supply power to a vehicle load installed in the vehicle,
the auxiliary power storage device comprising a power storage portion and a housing case storing the power storage portion,
wherein the housing case comprises:
a hole portion fitted to a terminal portion of the power storage portion;
a first guide portion provided on a wall surface standing from a peripheral portion of the hole portion for preventing a liquid drop flowing down along the wall surface from intruding into the hole portion, the first guide portion including a projection portion that is triangle shaped and integrally formed with the wall surface; and
a second guide portion provided at the peripheral portion of the hole portion for preventing a liquid drop from intruding into the hole portion from the peripheral portion of the hole portion, the second guide portion including an inclined surface, which is inclined downward from a low end of the projecting portion, and a linking surface, which links with a low end of the inclined surface, the linking surface disposed below the terminal portion of the power storage portion.

* * * * *